United States Patent Office 3,510,950
Patented May 12, 1970

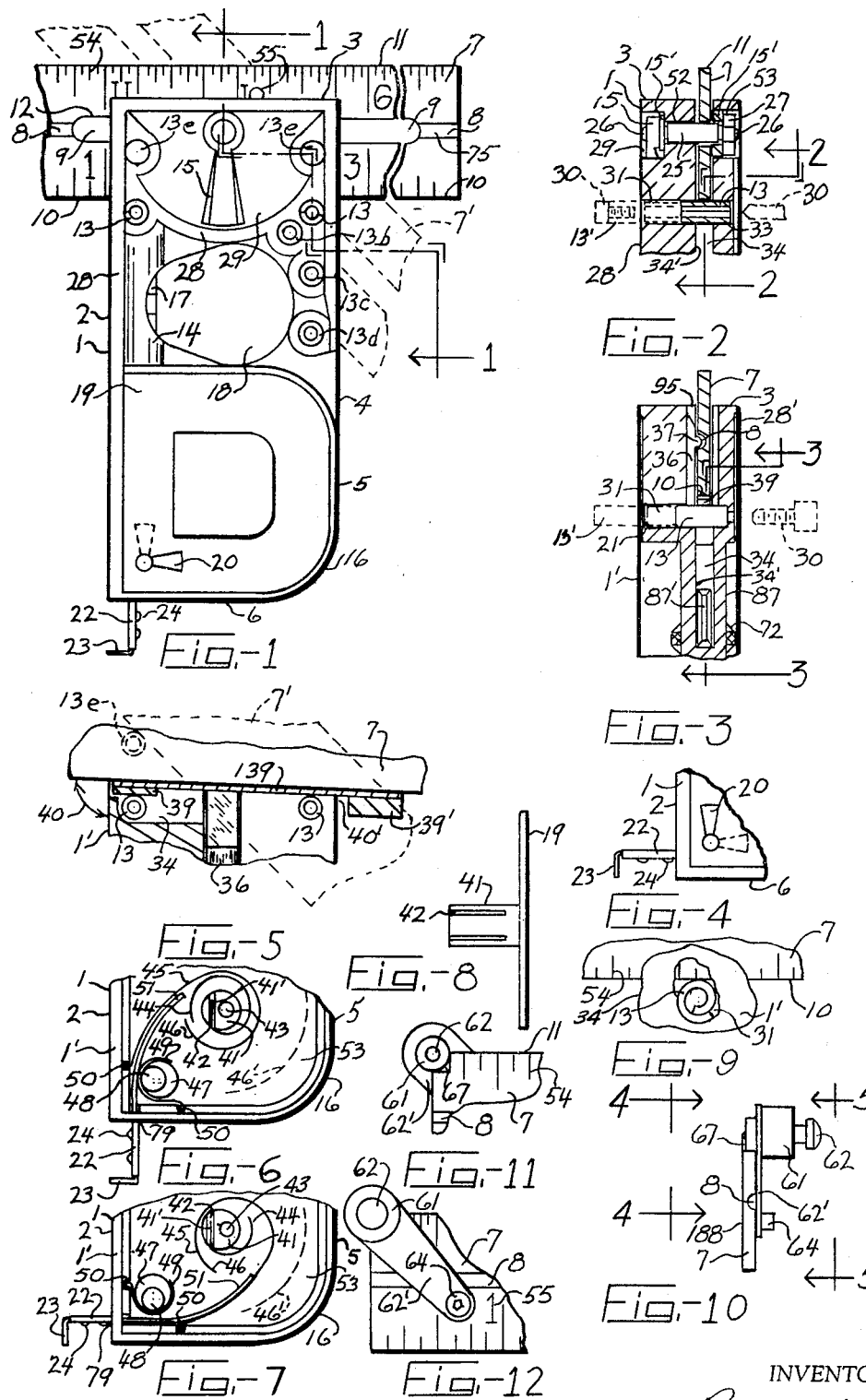

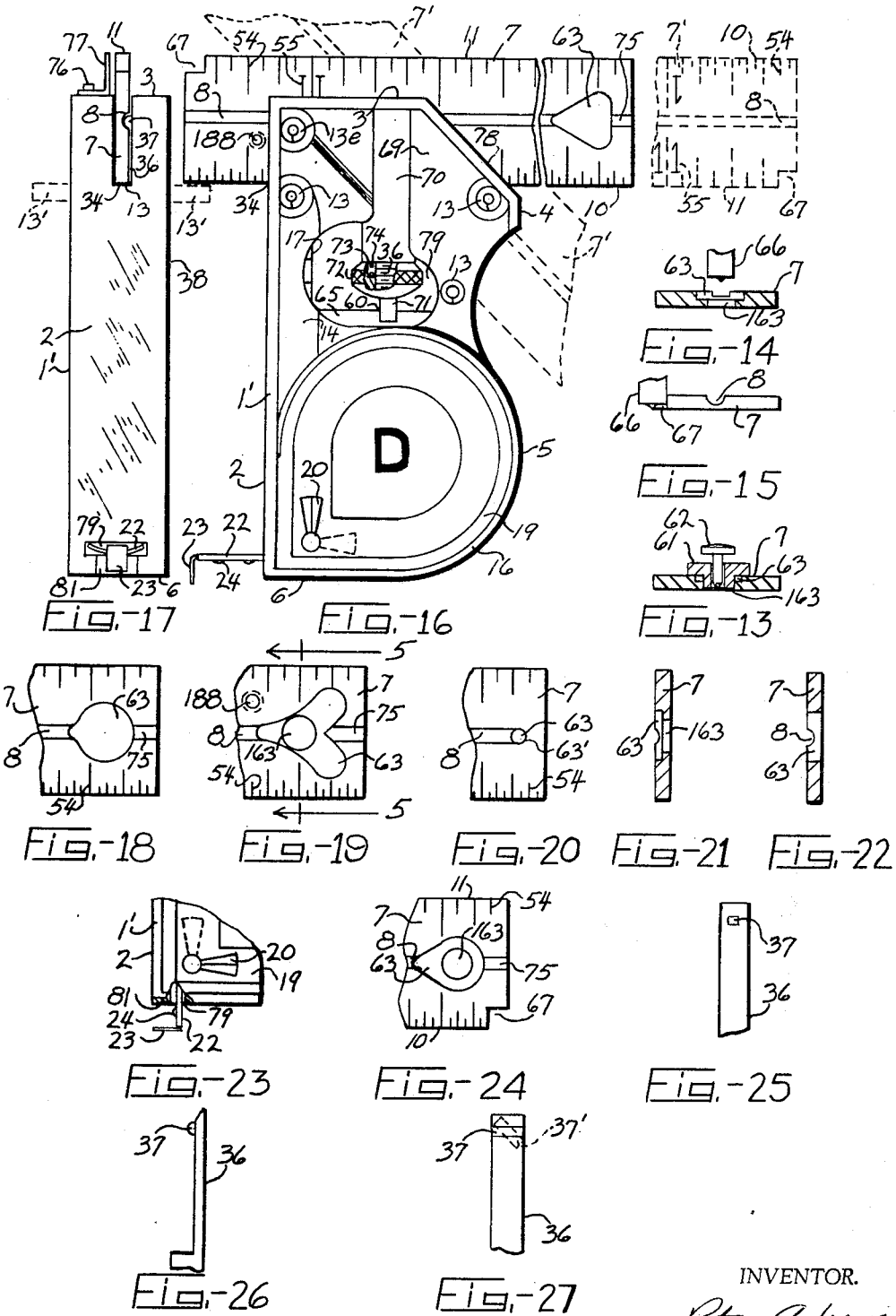

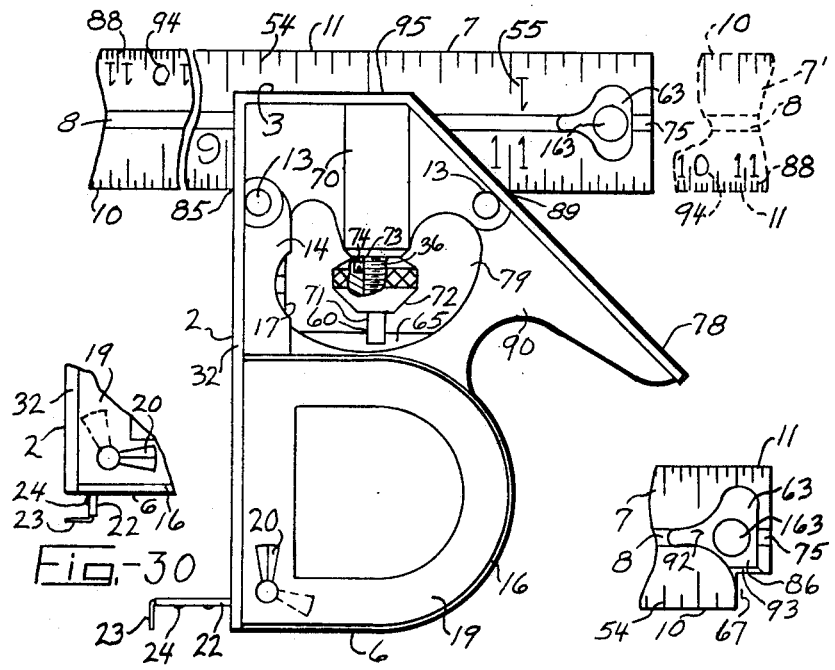
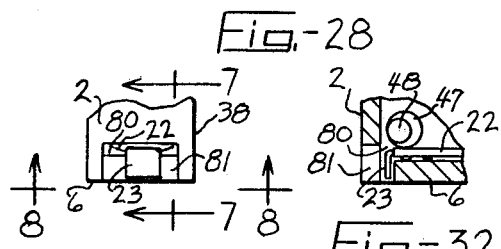
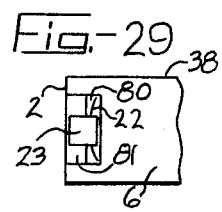
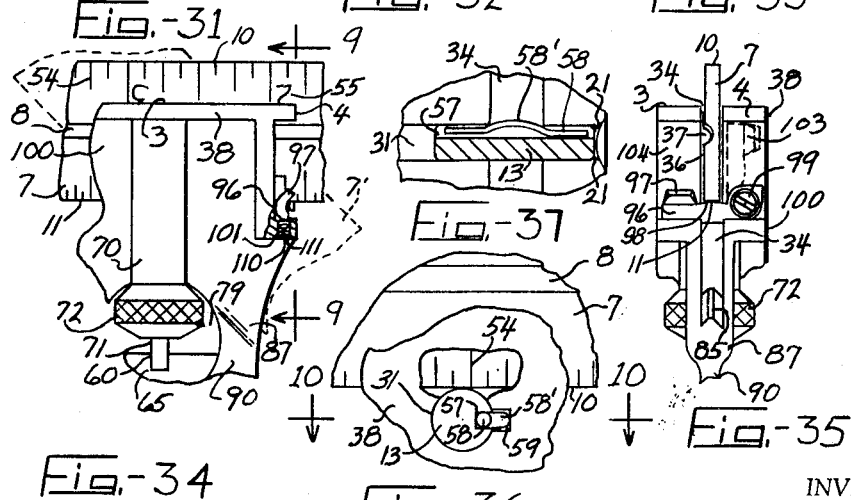

3,510,950
SINE, PIN-HEADED DUAL SQUARE
Peter Andrews, 190 Gebhardt Road,
Penfield, N.Y. 14526
Continuation-in-part of application Ser. No. 167,609,
Jan. 24, 1962. This application Jan. 19, 1968, Ser.
No. 699,199
Int. Cl. B43l 7/06
U.S. Cl. 33—94                                26 Claims

ABSTRACT OF THE DISCLOSURE

A combination square having various elements in combination that, accordingly, enables a person to have or transform the square, by substantially using and/or moving a rule means which is releasably clamped or secured substantially on pin barrier means and by substantially using an opening which is in open association with a conventional groove and/or slot in the rule means, and completely removing the rule means from the square's head as desired, into substantially a sine angle square; sine pin-headed dual square; a right angle or 90 degree square; removable and/or a 180 degree pivoting grooved rule square; 15, 30 or 45, for example, oblique angle square; full 360 degree bevel square; semi rigid resilient flexible concavo-convex tape measure dual square and/or a substantially rigid gauge square; pin-headed level means square, surface gauge pin-headed dual square and the like.

---

This application is a continuation-in-part of my copending application Ser. No. 167,609, filed Jan. 24, 1962 now Pat. No. 3,364,581 which was a continuation-in-part of application Ser. No. 786,069, filed Jan. 12, 1959 which was a continuation-in-part of application of Ser. No. 611,926 filed Sept. 26, 1956.

The present combination invention relates to improvements in universal or combination squares and the like, having slotted and/or grooved releasably clamped or secured rule means. It consists of at least one unique combination, construction and arrangement of parts or elements as hereafter described and claimed.

It is well known that it is, at times, very annoying and/or difficult for a person to reinsert the transverse nib, of a rule clamping stud means, back into the longitudinal groove extending centrally in the face of a rule means.

It is also well known that combination squares used by carpenters, mechanics, machinists, tool makers, artisans, handy men and the like have been patented for allowing a person to obtain, for example, 90 degree angle and an oblique 45 degree by merely using the edge surfaces which are integral with the square's head. It is also known that various combination devices have been patented for prick punching a surface and for 180 degree pivoting of a slotted straightedge rule and/or a slotted graduated rule means releasably clamped in the head of a square. It is also known that flat in cross section, when free, graduated tape measures have been housed in the heads of squares. The latter, for example, being A. E. Krebs, Pat. No. 530,111, issued Dec. 4, 1894; and R. J. Burroughs, Pat. No. 1,323,742, issued Dec. 2, 1919; and D. E. Baine, Pat. No. 1,690,919, issued Nov. 6 1928.

It is also well known that a slotted rule means only may be pivoted 180 degrees and whereby the transverse rib or nib is impossible to slide free of the rule without disassembling a portion of the rule clamping means, or accordingly use the slot as is a groove in a rule.

It is also believed that H. A. Farrand, Pat. No. 1,402,-589, issued Jan. 3, 1922, invented the flexible tape measure having a concavo-convex cross sectional shape, when free. It is also known that the combination square head having an integral 45 degree oblique angle edge, was patented by D. R. Hayes, Patent No. 1,324,963, issued Dec. 16, 1919 and having a transverse nib ended clamping stud, with the nib engaging a longitudinally extending groove in one face of a rule means, which transverse nib is generally further shown in the rule clamping stud protractor patent to J. W. Parker, Pat. No. 1,529,209, filed Dec. 15, 1923 and issued Mar. 10, 1925.

Accordingly, it is a primary object of this improvement combination invention to provide at least one rule bearing support or an axially slidable pin barrier means in the head of a square for allowing a person to obtain, for example, a 90 degree; 45 degree, other oblique angles; sine angles or a 360 degree bevel square construction accordingly, as desired, in an improved facile, economical, and efficient way.

Another important object of this invention is to enable a person to accurately measure over an obstruction and/or extend the length of the improved or a graduated rule means, which is removably secured in the head of the square, by having a flexible resilient and graduated flexible measuring tape of concavo-convex cross section, when free, for use as a lengthwise extension of the graduated rule through the inherent tendency of said tape measure, when free, to form a substantially rectilinear rod-like state.

Still another important object of this invention is to enable a person using a transverse or other form of a nib in a longitudinal groove extending substantially centrally of a rule's width to thereby either; pivot the longitudinally grooved graduated or ungraduated rule member 180 degrees in the head of a combination square; or entirely remove the rule from the head of the square, as desired, without disassembling any part of the rule clamping means, by having a cavity or an opening in direct communicating associated combination with substantially the end portion of the disclosed groove.

Yet another important object of this invention having the previous object in mind, is to enable a person to pivot the grooved and/or slotted rule substantially in the head of the square, using the nib ended portion of a rule clamping stud means, so that a different set of indicia and/or graduation markings are not upside down and are directly readable for example, so that English and/or metric graduations may be readily obtained in a facile, economical and efficient way, without removal of the nib from the rule or the rule from the square head, if so desired.

And yet another important object of this invention having the two previous objects in mind, is to have a dead end in the longitudinal groove and/or insert a stop means in the longitudinal groove, in one face of the rule means, to thereby create a dead ended longitudinal groove to prevent an improved nib portion of a rule clamping stud from accidentally slipping out of that end portion of the groove, whenever a manual 180 degree turn around or pivoting operation of the rule, is desired.

A further important object of this invention is to enable a person, using a sine pin-headed dual square, to extend a resilient, graduated and flexible measuring tape measure, having a concavo-convex cross section, when free, at a substantially perpendicular angle from the rectilinear bottom edge portion of a removably secured rule means, in the square's head.

Another object of this invention is to enable a person, using a rule having at least one notched out corner, to prick punch a surface, in one operation, without adding or subtracting any portion of the measuring indicia on the rule means which is removably secured in one end of the square's head.

Another further important object of this invention is to enable a person, using a rule having at least one notched out corner, to prick punch a surface in one operation, and in either one or two separate directions without adding or subtracting any measuring indicia from any rule and/or any tape measure means that is removably secured and/or housed in the square's head.

A still another object of this invention is to enable a person, using a rule having at least one notched out corner and at least one dead ended groove or at least one cavity and/or opening in direct open communicating associated combination with the longitudinal groove in the rule's face, so that the rule member may be pivoted 180 degrees in the square's head in order to present the notched out corner portion spanningly over a small obstruction or fillet and without raising the length of the rule, when executing an inside corner, for example, squaring operation.

A still another object of this invention, having the previous 3 objects in mind, is to enable a person to either pivot a longitudinally grooved rule 180 degrees or to completely remove the rule from the nib ended rule clamping stud and square's head by having the nib portion exit out of at least one portion of a groove communicating cavity and out through a notched out rule corner portion, as desired.

A still further object of this invention is to enable a person to pivot a substantially and/or a longitudinally grooved rule 180 degrees in a substantially simplified, facile and economical manner by having the rule clamping stud, nib turn around or pivoting portion in the same end of the rule as is the notched out rule corner, whereby less rule corner pivoting clearance is required between the bottom of a portion of the rule retaining slot, in the square's head, and the captive retained height position of the nib on the end of the rule clamping stud.

A still yet further object of this invention is to enable a person to extend a resilient, graduated and flexible concavo-convex measuring tape out of an aperture substantially connecting one side and one bottom edge portion, in one corner remote from the rule receiving slot in the square's head, so that the tape measure may be so arranged in a substantially enclosed cavity of the square's head that it may be used as an extension of the removably secured rule means or may be extended at a substantially perpendicular angle to the length of the removably secured rule means, as desired.

Another object of this invention is to enable a person to use a punch and bushing set which is nestingly positioned in at least one notched out rule corner for executing surface prick punching operations without adding or subtracting any indicia for the radius of a portion of the bushings outer nesting diameter and/or having an outer diameter portion of any center punch means nested in the notch, accordingly.

Another further object of this invention is to provide a blind cavity and/or an opening entirely through the thickness end portion of the rule means as a turn around area for the conventional rectilinear integral transverse rib that is engaged in the longitudinal grooved face portion of present day straight-edges and/or graduated rule means.

A yet another important object of this invention is to use a pivoting rear gate 90 degree rule supporting member whenever a person desires to have, for example, a 45 degree or other oblique angles, in that the rule member is pivoted further into a slot in the square's head and then being releasably clamped in place, as desired, accordingly.

And another object of this invention is to enable a person to measure, for example, the length of a board, and at the same time scribe an oblique angle line across the width of the board, using a tape measure lock means, a concavo-convex in cross section, when free, tape measure, the head of a pin-headed square and at least one rectilinear longitudinal edge of a removably secured rule means, in the head of the square.

And another yet still further object of this invention is to enable a person to extend the length of a removably secured rule means by using a concavo-convex in cross section, when free, tape measure and without adding or subtracting any, for example, square head width indicia on either the rule or the tape measure means.

A still another object of this invention is to enable a person to accurately and easily prick punch a surface by using a bushing and punch set having an arm which is secured by screw means to the rule that is threaded into a tapered hole in the rule, and having the bushing nested into a notched out corner or an opening in the rule member.

A still another yet further object of this invention is to provide additional indicia on the flexible, resilient and graduated measuring tape of concavo-convex cross section, when free, for the overall length of the square's head, or from one end portion of the square's head to the outer rectilinear top surface of a rule means therein, or for substantially the width of the square's head, accordingly, to aid in making measurements therewith.

Other objects and advantages will readily appear to one skilled in the art, having this disclosure and application before them.

For a fuller understanding of the nature and objects of this invention, reference should be had to the following brief description taken substantially in connection with the accompanying drawings wherein:

FIG. 1 is a side elevational view of one embodiment of this, sine pin-headed dual square, combination invention.

FIG. 2 is a cross sectional view taken substantially along sectional line 1—1 of FIG. 1.

FIG. 3 is a cross sectional view, of another embodiment of the upper portion of the square's head being substantially also taken along line 1—1 of FIG. 1, wherein a longitudinally grooved rule and a nib ended rule clamping stud is used, accordingly.

FIG. 4 is a partial sectional view to show how the curved or concavo-convex tape measure may be extended 90 degrees, from that shown in FIG. 1.

FIG. 5 is a cross sectional view of FIG. 2 and FIG. 3 substantially along line 2—2 and 3—3 respectively to show how a sine angle means is obtained using turn pin barrier means in the square's head, accordingly.

FIG. 6 is a lower cut away sectional view of FIG. 1, with a portion of the tape measure cavity cover removed, showing two examples of the interior element position and construction of the square's head and the tape measure aperture with a portion of the tape measure therein, accordingly.

FIG. 7 is a lower cut away sectional view also with a portion of the tape measure cavity cover removed, as is substantially shown in FIG. 6 but here a portion of the concavo-convex tape measure is shown extended out substantially 90 degrees from that shown in FIG. 1, but accordingly is as shown in FIG. 16, also.

FIG. 8 is a side view of the tape measure cavity cover with the tape measure coiling spring post integrally thereon.

FIG. 9 is a cut away sectional view of the square's pin-headed portion showing a spirol coiled pin barrier means located in an opening for supporting a rule means, accordingly.

FIG. 10 shows a cut away section of a graduated rule means having a notched out corner and a punch and bushing set nested therein.

FIG. 11 shows an end view substantially along line 4—4 of FIG. 10 but herein a punch and bushing set integral arm is secured to one face of the rule by screw means, substantially shown in FIG. 12.

FIG. 12 shows a top view along line 5—5 of FIG.

10 to show the removably secured position of the arm disclosed in FIG. 11 accordingly.

FIG. 13 is a partial cross section of a punch and magnetized bushing nested in an opening through a grooved rule means.

FIG. 14 is a partial cross sectional view of the lower end portion of an automatic center punch means prior to its being nested in an opening through a grooved rule means.

FIG. 15 is a partial sectional view of the lower end portion of an automatic center punch means nested in a notched out corner portion of a grooved rule means.

FIG. 16 is a side elevational view of still another embodiment of this improved "sine pin-headed dual square" combination invention having a conventional concavo-convex tape measure means.

FIG. 17 is a front elevational view of the FIG. 16 embodiment combination invention.

FIG. 18 is an end portion of the rule means substantially shown is FIG. 16 but being with or without the notched out corner and tapped hole means and showing herein a generally round turn around opening for the rule clamping nib on one end of the rule clamping stud, shown in FIG. 17 accordingly.

FIG. 19 shows a transverse nib and/or a short nib means turn around area in one end of a grooved rule means.

FIG. 20 shows a dead ended, longitudinal extending groove, short nib turn around area in one face of a dead ended groove rule means.

FIG. 21 is a cross sectional view taken along line 5—5 of FIG. 19 showing a nib turn around cavity in communicating associated combination with a longitudinally extending groove in the face of a rule means.

FIG. 22 is a cross sectional view taken also along line 5—5 of FIG. 19 showing a nib turn around opening entirely through the thickness of a rule means accordingly in combination with a groove means as fully disclosed in FIG. 21.

FIG. 23 shows the hook ended resilient, graduated and flexible concavo-convex, when free, tape measure extending substantially 90 degrees from that shown in FIG. 16 and lock means accordingly, otherwise being substantially a cut away portion of the lower left FIG. 16 embodiment.

FIG. 24 shows a conventional transverse nib and/or a short nib turn around cavity and a notched out corner of a rule means both in the same end of a rule means.

FIG. 25 shows an upper integral portion of a rule clamping short nib in a substantially square ended or which may be a substantially round form to be, for example, used in the turn around dead end groove of FIG. 20.

FIG. 26 is substantially a side view of FIG. 25 rule clamping short nib and stud end accordingly.

FIG. 27 shows a swiveling or pivoting transverse nib secured in the upper end of a rule clamping stud means.

FIG. 28 is an improved, longitudinally grooved and removably secured 180 degree turn around, nib cavity, rule member which may also be used in the head of a conventional combination square and/or in a dual square accordingly, as desired.

FIG. 29 is a longitudinally grooved rule, in fragment, having the nib turn around area or cavity in nib entry or exiting associated communication with a notched corner portion of a rule means, as desired.

FIG. 30 is the lower end of FIG. 28 of the dual square, in fragment, showing a concavo-convex, when free, tape measure extended substantially perpendicular or substantially at a right angle to the bottom rectilinear horizontal edge of the embodiment of the improved, nib pivoting and grooved, graduated or ungraduated rule member as seen in FIG. 28.

FIG. 31 is a, in fragment, lower front view of a dual square head or a sine pin-headed dual square head having a, two way, tape measure aperture in two side edges thereof.

FIG. 32 is a, in fragment and taken along line 7—7 of FIG. 31, two way, tape measure aperture in cross section.

FIG. 33 is a, in fragment and taken along line 8—8 of FIG. 31, bottom view of the, two way, tape measure aperture.

FIG. 34 is a, in fragment, rear corner side view of a rear pivoting gate rule supporting member of a sine pin-headed dual square head.

FIG. 35 is a, in fragment and taken along line 9—9 of FIG. 34, rear view of the pivoting gate rule supporting member and the gate's dashed line clockwise moved position.

FIG. 36 is a, in fragment, elevational side view of a sine pin-headed dual square head having a rule member supported by a pin barrier means having a sliding frictional resilient means integral therewith, and FIG. 37 shows a slotted pin having a resilient spring therein.

Referring now more specifically to the drawings, wherein FIG. 1 shows reference numeral 1 designating one embodiment, in general, of a pin-headed dual square head having a substantially universal combination and a bevel square construction, in its upper portion, in accordance with the teachings of this invention.

The head 1 having a side edge 2; a top edge 3; a bottom edge 6; and third or rear edge 4 and also indicated in FIG. 16 as 5 and here as 5, both of which are in alignment, with the edge 5 being a portion along the rear of a concavo-convex tape measure housing 16. The ungraduated or graduated measuring rule member 7, as desired, wherein, for example, the graduated rule 7 having a different measuring scale 54 along each longitudinal edge of each face, with measuring indicia 55 accordingly, as is conventional in combination square tools of this kind. The rule 7 having a substantially centrally located slot 9 in communicating associated combination, if desired, with a groove 8 which exits out of at least one face end of the rule 7. The rule 7, as is generally shown in FIG. 2, clamping handle 15 is integral with the shank 25 having a threaded end 26, which is threaded into a nut 27 that is captively retained, at least against rotation, in a cavity 53. The clockwise and counterclockwise, manually rotated handle 15 is located adjacent to or substantially against the bottom wall of a cavity 29 so that the head 1 may be placed flat on its side 28, as desired. Upon clockwise rotation of handle 15, the threaded nut 27 or head of a screw with its threaded end into handle 15, may also be clamped, not shown, directly against one face of the rule 7 for releasably securing the opposite face thereof (not shown) against an inside wall 34' of rule 7 receiving slot 34 and at the same time a bottom portion of the rectilinear edge 10 of rule 7 is retained against an upper diameter portion of a pin 13 substantially as shown in the fragmentary view of FIG. 2. Should the nut 27 be restricted, and the cavity or opening 53 not being entirely through to the slot 34, as shown in FIG. 2, or that wall portion be itself threaded for receiving the end 26, whereby the nut 27 is eliminated, then the tightening rotation of handle 15 would force at least one inside wall of slot 34 clampingly together against at least one face of rule 7 and accordingly effecting a removably secured rule 7 means as disclosed hereabove for the, nut 27, rule 7 clamping operation, if so desired. The latter rule 7 removably secured operation has been found to be effective and conveniently executed if the slot 34 is substantially offset, as shown in FIG. 2. Accordingly, the nut 27 or the head of a screw direct clamping construction prevents the need of any axial movement of the sliding pin 13 means in its gapped tunnel-like or bore opening 31. The use of the nut 27, thereby gives a person further advantages in that the handle 15 is adjustably positioned for allowing a person to compensate for wear of or in any of the above associated elements, as the tool is used for clampingly or removably securing the rule 7 when making, for example, the shown 90 degree and 45 degree settings. The 15 degree and 30 degree rule settings, not shown, are accomplished merely by forcing manually at least one pin 13b, c, d or e, in the generally circular boss in edge 28, as a barrier across the slot 34, by a manually inserted pin, nail, threaded machine screw and the like 30 means, which is generally shown in phantom, in FIG. 2. The shank 25 being accordingly used as a slotted rule 7 pivot means, since it is already inserted through the slot 12, thereby requiring at least one pin 13b, c, d and/or e means to obtain the 15, 30 and 45 degree angles, as desired. When a full bevel square, using slotted rule 7, construction is desired, all of the pin 13 is manually forced or threadingly pulled back accordingly in opening 31, by the dash line in phantom, pin, nail or threaded screw means or the like, so that one end of pin 13 is substantially flush with the side edge 28. A person can thereby releasably secure and pivot the slotted rule 7, in a 360 degree arc, around the shank 25, if desired. The shank 25 is inserted and rotates in the bore 52, accordingly. It is understood that the pin 13 would require a tapped or threaded internal hole for receiving one end of, for example the in phantom, threaded machine screw in order to pull its one end back substantially flush with the head's face or side edge 28. One or both outer end surfaces of at least one opening 31 may be, for example, pricked or peened to form an obstruction, after the pin 13 is inserted therein, that would captively retain the pin 13 in the opening 31. Thereby accidental forcing or pulling of pin 13 entirely out of opening 31 or losing the pin 13 is substantially prevented.

It should also be understood that pin 13 or pins 13 when mentioned in this specification is to substantially mean any, for example, member having at least one round or substantially round outer surface against which the rectilinear longitudinal edge portion or surface 10 of the rule 7 member rests or is supported thereby. Some of these pins 13 are, for example, internally threaded or unthreaded, rollpins having axial slits or diagonal slits; solid or tubular dowel pins or spacers; Spirol pins; tubular Buttile Spacers; drill jig bushings having a shouldered or straight outer diameter; tubular spring and axially grooved hollow or solid pins having a separate resilient means therein; and the like; substantially considered as being in the pin means art, as used in the FIG. 1 pin-headed dual square or in the FIG. 3, FIG. 16, for example, sine pin-headed dual square invention.

Reference being made back to FIG. 1, which shows opening 18 and the concavo-convex tape measure 22 housing 16 having a cover 19 and a cam lock handle 20 shown in its dashed line counterclockwise, tape measure 22, locked position. The tape measure 22 is shown partially extended from its housing 16. The tape measure hook 23 and rivets 24 are also shown. The level vial 17 and its housing portion 14 may be offset to one side so that the bottom of the slot 34 partially shown in FIG. 2 is substantially down to the upper outside wall portion of housing 16, if desired or deemed necessary to, for example, removably secure the rule 7, or enable a person to obtain oblique angles, opposite to that shown in dashed line 7', by using the second set of pins 13, 13b etc., that are (not shown) otherwise being towards edge 2. Arm 15 and shank 25, shown in FIGS. 1 and 2 respectively, may be located off center and not as shown, if so desired, especially when only one pin 13 is used.

The FIG. 3 is a fragmental view of one embodiment of the sine pin-headed dual square, taken substantially along line 1—1 of FIG. 1, in which case the upper portion of FIG. 1 would be changed to that substantially, as that shown in FIG. 16 regarding the nib ended 37 rule 7 clamping stud 36 and its barrel housing 70 and threaded nut 72 means as is used in conventional combination skuare tools, according. The pins 13, 13b, c, d and e would be used, as desired, and located in the head 1 substantially as shown in FIG. 1. The nib 37, located in bore 95 which is in the plane of slot 34 in FIG. 3, is shown engaged in slot 9 and/or in groove 8 accordingly, as desired. The groove 8 allows the nib 37 to enter therein when, for example, the rule 7 is desired to be entirely removed from the slot 34 or head 1', and without disassemblying any portion of the combination tool, that must be executed with the rule 7 clamping structure shown in FIG. 1. Boss 87' may be desired.

The FIG. 3 further shows a sine angle spacer 39 means that is manually inserted between a top diameter portion of pin 13 and a bottom edge 10 portion of rule 7 means for obtaining a sine draft angle of, for example, say 2 degrees, 3 degrees, 5 degrees and the like, generally used by tool and/or mould makers, accordingly. Thereby positive and negative sine draft angles may be obtained in a facile, economical and efficient way, never before possible, with a non pin-headed combination or universal square tool. The horizontal center distance between the main, rule 7 supporting, pins 13 may be, for example, 1.66667 inches. Thereby when a person desires to obtain a 2 degree sine angle, he moves the decimal point one place to the right, in the sine table value of 2 degrees as found in a machinery handbook, then divides that number by 6 to find the spacer 39 thickness, as shown in FIG. 3. The spacer thickness should be substantially .0582 thousandths of an inch.

The FIG. 3 shows, for example, an allen head threaded machine screw 30, in phantom, that may be threaded into the pin 13 for manually pushing and pulling the pin 13, as desired, across or free of slot 34, especially if the opening 31 is substantially dead ended or counterbored, as shown. The other end of opening 31 may have a pin 13 exiting prevention obstruction 21, if desired.

FIG. 4 is a fragmentary corner view of FIG. 1, showing the tape measure 22, with its hook 23 and rivets 24, exiting out of head 1 and side 2 so that additional measuring extension may be obtained for the graduated rule shown in FIG. 1 7, if so desired. The tape measure 22 can lock arm 20 is also shown in its clockwise, dashed line, tape measure 22 locking position.

FIG. 5 shows the rule 7 and head 1' in fragment, showing a 2 degree sine angle spacer 39 between the two spaced apart parallel pins 13 and the side edge 10 of rule 7 which is a grooved and/or slotted straightedge or a graduated rule member, as desired. The positive sine angle 40, subtracting 90 degrees therefrom, and negative sine angle 40' is also substantially shown. This FIG. 5 sine angle construction is also obtainable and typical of the embodiment shown in the FIG. 16 sine pin-headed dual square with or without the tape measure 22 integral housing, substantially as shown in King Pat. No., 448,440, issued on Aug. 31, 1948, in the lower end of head 1', if desired. The lower end of head 1 and/or 1' would thereby be as is conventional in combination squares. The head 1' is substantially as is shown in FIG. 16, and accordingly is different from the head 1 having a different pin 13 arrangement and construction in its upper portion. Accordingly, the construction of rule 7 clamping stud with its nibbed end, in square head 1, is generally shown in FIG. 3, for example, being along line 1—1 of FIG. 1, wherein the nib construction and arrangement is not shown because it is a different embodiment. The arm 139 having a 2° spacer 39 and, for example, 5° spacer 39'.

FIGS. 6 and 7 are a fragmentary cut away view of the lower portion of the pin-headed dual square head 1 and the sine pin-headed dual square head 1', wherein tape measure 22 power return conventional reel means 46' is substantially not shown but the, tape measure 22 balance or return and/or tape measure power return reel, conventional spring means 44 is shown therein. The spring 44 having its inner end conventionally anchored in the slot 42, of post 41, wherein a conventional screw receiving opening 43 is also located, if desired, for retaining the cover 19, not shown, but in FIG. 8, it shows the substantially conventional tape measure 22 cover 19 with post 41 thereon.

The tape measure 22 cam lock 47 is also shown therein, with the cam's pivoting shaft 48 thereon. In FIG. 6 the cam 47 must be rotated, through the use of arm 20 shown in FIGS. 1 and 16, for example, in a counterclockwise rotation and in FIG. 7 the cam must be rotated in a clockwise rotation, for releasably locking the tape measure 22 to an interior cavity wall portion of head 1 or 1' as the case may be. It has been found, when using the tape measure 22 end 51 coiling spring 45 only in the cavity, that the manually inserted tape measure 22 end 51 is coiled in a tighter coil when the tape 22 is inserted, for example, as shown in FIG. 17, with the convexed portion of the tape 22 against the inside wall of the resilient band and/or a negator spring means 45. Accordingly, it is preferable to have a portion of the tape 22 end 51 substantially flat in cross section, when free, or in a weaker resilient state so that a tight coil is initiated, regardless how the end 51 is manually inserted into the tape 22 resilient coiling means 45 and against the end 46 thereof, accordingly. The cavity or axially slit open end opening 50, being in at least one inner wall portion of the tape 22 cavity, is for captively retaining at least one formed end of the resilient band 45 therein. The push button power return means may be located substantially in the center and in the form of a D as seen in FIG. 16, for example. The tape 22, positive cam lock 47 and arm 20 to be used, as desired, in combination with the substantially conventional power return push button, not numbered.

FIG. 8 shows the cover 19 and conventional integral post having a slot 42, which receives a conventional end 44' of the conventional resilient means or spring 44, as is generally shown in FIG. 6, for example. The other outermost coiled end of spring 44 is removably and operatively hooked onto the end 51 of tape measure 22, not shown, in the conventional manner known to persons skilled in the art. The post 41 and/or spring 44 may be eliminated when spring 45 is used in cavity 53, and only cover 19 may be used and which is removably secured to the housing 16 with screws inserted into bosses, neither of which are shown, in a conventional manner. The spring 45 permits complete manual withdrawal and stepwise insertion of tape 22 into cavity 53, generally as is a sword inserted in its scabbard. The tape measure 22 power return reel 46' is also power rotated by spring means 44, which has its outermost coiled end anchored to the inside of reel 46', for examples, in a conventional manner, if reel 46' is desired to be used in cavity 53. The reel 46' is also partially and substantially shown in dashed line outline in FIG. 6, for example.

FIG. 9 shows rule 7, in fragment, in slot 34, for example, having its edge 10 supported by an outer diameter portion of a Spirol pin 13, which is axially housed in opening 31, shown in the fragment of side of head 1'.

FIG. 10 shows the graduated rule 7 with a notched out corner 67 having a punch 62 nested in a bushing 61, which is secured to one end of arm 62', which is removably secured by screw means 64 to one face of rule 7. A threaded portion of screw 64 is inserted into a tapped hole 188, which is shown in FIG. 16, for example.

FIG. 11 is taken substantially along line 4—4 of FIG. 10 and basically shows how the punch 62 and bushing 61 set is nested in notch 67, so that the exact axial center point of punch 62 is accurately positioned or located in the middle of the intersection of the end of rule 7 and its rectilinear top edge 11. Thereby, no indicia or generally any fraction of a measurement need be added or subtracted, because of the punch or bushing radius, to any measurement length of rule 7 and/or tape measure 22, when prick or center punching a surface in one or two separate directions and in only one operation, is desired.

FIG. 12 is taken along line 5—5 of FIG. 10 and shows the graduated rule 7 in fragment, groove 8 and head of screw 64, removably securing arm 62' to one face of rule 7. Accordingly, the punch 62 and bushing 61 set is removably secured to one end of arm 62' which accurately retains said set nestingly in the hidden notch 67, for one or any number of repeated surface center punching operations.

FIG. 13 shows a punch 62 and bushing 61 set, with a lower portion of bushing 61 being nested in opening 163, of rule 7. The opening 163 is axially through the bottom wall of nib turn around opening 63 and may be inserted therein in any desired distance, for example 1 inch and under, from the end of rule 7, as long as opening 163 is at least substantially through the wall of opening or cavity 63. The bushing 61 may be a magnetized one or a plain unmagnetized one, as desired.

FIG. 14 shows the fragmentary end of a punch or an automatic center punch 66 just prior to its being inserted into opening 163, which is axially through the bottom wall of blind opening 63. The opening 63 may be entirely through the rule 7, as is shown in FIG. 22, for example, and the internal shape of the opening 63 be axially shaped round, substantially round or have its wall portion contact an outer diameter portion of, for example, the FIG. 13 plain or shouldered bushing 61 in at least 3 points thereof (not shown). Thereby opening 163 would inherently be in opening 63, if so desired for locating the bushing 61 therein.

FIG. 15 shows a fragmentary lower portion of a punch 66 or an automatic center punch being nested in the notch out 67 corner of rule 7. Thereby the same indicia or measurement advantage is obtained, as was disclosed in FIG. 11, using the punch 62 and busing 61 set with the screw 64 secured arm 62'.

It also has been found that one opening 50 may captively retain the end of the band 45 and the other opening 50 may captively retain a formed end of a tape 22 resilient braking band 49 means, while its other end is formed around a portion of the cam 47, substantially as shown in FIG. 6. As the cam 47 and arm 20 (not shown) is rotated slightly counterclockwise, an outer wall portion of the band 49 is pressed lightly, in braking action, against the tape 22, accordingly. Upon further rotation of cam 47, the band 49 is releasably locked against the tape 22 which is thereby locked in place, as desired. The tape 22 aperture 79 is also shown in the side edge 6, in FIG. 6 and in the side 2, in FIG. 7, as desired.

The FIG. 16 shows a sine pin-headed dual square having at least three pins 13 in the square head 1'. The two spaced apart horizontal pins 13 are also used for the sine angle operation as disclosed in FIG. 5 and the upper left pin 13e, for example, is used for the 45 degree moved position of rule 7, shown in dashed line ——7' outline, accordingly. The rear edge 4 and 5 are also shown as disclosed in FIG. 1. The longitudinally grooved 8 rule 7 may be conventional or it may have at least one of the following as shown; a notched out corner 67, a tapped threaded hole 68 and a blind opening or cavity 63, which cavity shape may also be an opening 63 entirely through the thickness of rule 7, if so desired, and is substantially shown in fully shown in FIG. 21 and FIG. 22, respectively. The disclosed blind cavity 63 having the advantage, for example, in that the opposite face of the rule 7 will maintain its conventional appearance, if so desired. Both, of the disclosed opening or cavity 63 are nib turn around opening or cavity because they are used for allowing the conventional transverse nib 37 as shown in the disclosed Parker Patent, for example, or as shown in FIGS. 25, 26 and 27, to escape out of the groove 8 and thereinto said opening or cavity for allowing a person to substantially pivot the rule 7 around 180 degrees for presenting the notch 67 to the bottom rear as shown in dashed line outline ——7, if desired, or for presenting the upper set of inverted indicia 55 and its graduations 54 accordingly, directly in front of edge 2 of head 1', and thereby having the indicia right side up, without removing the disclosed nib 37 from the rule 7, if so desired. That is, the rule 7 may also be automatically manually slid entirely out of slot 34 or head 1' merely by allowing the relased sliding nib 37 to continue axially along the groove 8, into and through the, for example, length of opening 63 and out of the short portion 75 of the continuation of groove 8, accordingly. The FIG. 16 further shows the rule 7 clamping stud 36 barrel portion 70, and screwed on the plain or slotted end 71 of stud 36 is a knurled clamping nut 72, which is generally the same or similar to that commonly provided with conventional combination square tools accordingly. Within the nut 72 is a cavity 73 which substantially houses therein an axially resilient means and/or a compression spring 74 means which exerts pressure axially against the bottom end of barrel member 70 so that the a said nib 37 (not shown) is in constant tension against the bottom of groove 8, or slot 9 in the rule 7 shown in FIG. 1, even when the nut 72 is unscrewed say, for example, 1 revolution, from its rule 7 clamped position, on the end 71 of stud 36. The axial pressure of spring 74 also substantially prevents the said nib 37 from being accidently slid out of the short 75 portion of groove 8 that is associated with the right side of opening or cavity 63, as seen in FIG. 16, wherever a person desires to execute a 180 degree pivoting or reversal operation of rule 7. It has also been found that spring 74 is not absolutely necessary to prevent the latter automatic said nib 37's accidental slipping out action, because a person may merely manually pull down on the loosened nut 72, even prior to the entry of nib 37 into the opening or cavity 63. Thereby, the nib 37 is forced down, against the rear wall of hold 63, as to prevent its being automatically slipped out of the short 75 portion of groove 8 and thereby be entirely free of the rule 7. Accordingly, the nib 37 may also be automatically slipped out of the short 75 groove 8 portion and be entirely free of the rule 7, merely by slightly loosening the nut 72, from its rule 7 secured or clamped position, and then manually exerting a slight upward force, for overcoming the spring 74 pressure if it is in its cavity in the nut 72, as the rule 7 is being manually slid to the left to remove it from the slot 34 and head 1'. When the rule 7 is slid entirely to the right, for example, then no special manual or spring action is required on nut 72, and the nib 37 is thereby automatically slipped out, in the conventional manner, from the groove 8 end which is, for example, shown substantially below to the notch 67, as shown in FIG. 16. The, for example, spirit level vial 17 is preferred to be centrally located as is conventional or as shown in King, for example, Pat. No. 2,448,440. The tape measure 22 housing 16 is integral to the opposite and lower end of side 2 of head 1'. The tape measure 22 housing 16, taken by itself or taken as a whole with tape 22, hook 23, rivets 24, arm 20, cover 19, and all its internally housed elements, may be removably but rigidly secured to the lower end of head 1', if so desired, for repair or replacement thereof, accordingly. Soft soldering, adhesive, and screw means are to be considered as making the head 1' and tape measure 22 housing 16 integrally together, so long as they are both rigidly secured together. Of course, welding, sliver soldering, brazing and the like would also make them integrally together, substantially as one piece, but not as easily separated when repair, replacement and the like are required. The head 1' and tape measure 22 cavity or housing may also be constructed or cast in one piece, accordingly as desired. The tape measure locking arm 20 is shown in its unlocked and in its locked dashed line clockwise moved position. The tape measure 22 is also shown extending horizontally from the side edge 2 or head 1' but it is preferred to have the tape 22 extend substantially parallel to the side edge 2, as is shown in the FIG. 23 fragmentary view. The end 71 having a slot 60 with the web 65 of the head 1' therein to prevent the stud 36 from rotating when rule 7 is removed from head 1'.

In FIG. 17 the grooved rule 7 is shown with the nib 37, of stud 36, in the groove 8. The integrally or rigidly secured spacer means 77, if used, has its top edge adjacent to and substantially flush with the top edge 11 of rule 7. Thereby, when the FIG. 23 of head 1' embodiment is constructed, having the tape measure 22 housing 16, then the overall length of the head 1' from the bottom of edge 6 to the top of the spaced 77 is the same overall distance as it is from the top edge 11 of rule 7 to the bottom of edge 6. This spacer 77 provides a desired one overall partial or whole indicia addendum, for the sine pinheaded dual square, to be mentally and/or physically added to the indicated extended length of tape measure 22, with or without the rule 7 being in the head 1'. Of course, if the housing 16 is not used in combination with the lower portion of head 1', then there is no need of spacer 77. The tape measure 22 aperture 79 is shown in the face of edge 2, and a recessed cavity 81 for hook 23 is also shown.

The FIG. 18 also shows another specifically shaped opening or cavity 63, in which the substantially pointed end of the teardrop hole aids the re-entry of the nib 37 (not shown) into the groove 8 when pivoting the rule 7 around. Accordingly, the substantially teardrop-shaped nib turn around, cavity 63 which may be a blind an opening 63 or a hole 63 entirely through the rule 7, as is generally shown in FIGS. 21 and 22 respectively. The opening or cavity 63 shown in rule 7, of FIG. 16, is also substantially arrow-head shaped, accordingly.

Accordingly, the FIG. 19 shows a substantially heart-shaped cavity 63, which may also be a blind hole 63 or hole 63, and as disclosed and shaped for the purposes and desires in the above FIGS. 16 and 18 description, for example. In the heart-shaped cavity 63 the curved upper portion will tend to slide the nib 37 and thereby tend to prevent an abrupt shock or damage to the nib 37 or opening or cavity 63 at the entrance of short 75 groove 8, for example. The substantially round hole 163 is for the insertion of a bushing 61 and punch 62 set, the lower end of a punch that has a flat or pointed end, or an automatic center punch means, for example a Starrett No. 819 punch, and the like, substantially as shown in FIGS. 13 and 14, respectively. Of course, the hole 163 may be used in the FIG. 16, rule 7, hole 63, substantially, or may be used for hanging the rule 7 on a pin etc. for display, scribing a circle therewith, and the like purposes, if so desired, as also is possible with the opening 63 shown in FIG. 20, for example, and if additionally and specifically shaped to locate accurately on the outer diameter of a bushing 61 or a punch 66, as shown in FIGS. 13 and 14, and the like. Of course, the short 75 groove 8 need not be in the face of rule 7, which short 75 extension portion of groove 8 need not be in one end of any rule 7 face or exiting out of any slot 9 as shown in FIG. 1 or opening 63, as for example, not be as shown in any of the rule 7 faces of FIGS. 1, 16, 18 and 19. Thereby being substantially as shown in FIG. 20, having a dead ended groove 8, short nib 37, turn around area, without the short 75 groove 8. Of course, if the short 75 groove 8 is already in the face of rule 7, it can easily be altered and/or substantially be eliminated, if desired, even if it were therein, by merely inserting a nib stop means therein and/or rigidly securing, soldering, welding, and the like, a piece of material into the short 75 groove 8, if desired. Also a portion of the material forming the ungrooved face, a rule 7, a portion of which material may be forced mechanically or coined into all or a portion of the short 75 groove 8 and thereby integrally, without the addition of a separate material therein, create a nib 37 stopping and/or dead end turn around area. This latter material moving, coining process or operations, into one end of groove 8 or the short 75 groove 8 portion is preferred, because it may be cheaply, economically and automatically executed in a facile way, even after the groove 8 is already in the full length of one face of rule 7, as in any conventionally manufacturing or purchased grooved rule means. Accordingly, the heart-shaped cavity 63 may have its upper curved portions come together, if the short groove 75 is not therein, as is generally shown in phantom, in dashed lines in FIG. 19, if desired.

The FIG. 20 shows a dead ended 63 groove 8, which end 63 is also a turn around area or opening for the short substantially square ended or substantially round nib 37 shown, for example, in FIGS. 25 and 26. The pivoting transverse nib 37', shown in FIG. 27 may also be used in the FIG. 20, dead ended 63 groove 8, rule 7 embodiment. The small hole 63' may also be inserted in the dead end 63 portion of groove 8, and be used substantially as disclosed in the FIG. 19, hole 163, if desired, and accordingly, either face of rule 7 may be down when performing the disclosed punching operations, in FIG. 19.

FIG. 21 shows the blind ended cavity 63, having a hole 163 through the end wall of hole 63, but the hole 163 may be eliminated, if desired, whereby the cross section would show the cavity end wall entirely, uninterrupted, thereacross in solid section. The FIG. 19 further fully covers the disclosure, desires and uses of hole 163.

FIG. 22 is a self-explanatory in that it is thought that it was fully disclosed previously in this specification.

FIG. 23 shows the cam 47 (not shown) locking arm 20 in its, tape measure 22, unlocked clockwise position and arm 20 in its dashed line counterclockwise, tape measure 22, locking position. Shown is a fragmentary corner portion of head 1'; side edge 2; tape measure 22 aperture 79; recess 81 for hook 23, if desired; and tape measure 22 extending out of the head 1' substantially 90 degrees from the manually extended position of tape measure 22, of FIG. 16, for example.

FIG. 24 shows the, in fragment, rule 7, graduations 54, and edge 11, and it shows hole 63, short 75 groove 8, cavity 163 and notch 67. The notch 67 and cavity 63 are both shown in the same end of rule 7, if desired. The short 75 groove 8 may also be eliminated or plugged up, if desired, and the cavity 63 thereby be a blind cavity or an opening 63 entirely through the thickness or both faces of the rule 7. The hole 163 may also be eliminated, if desired, when the blind ended hole 63 construction is used.

FIG. 25 is another altered and different embodiment of the conventional transverse nib 37 in that the improved short substantially square ended or substantially round ended nib 37 is integral with the stud 36 portion and is for use primarily in the FIG. 20 dead ended 63' nib 37 turn around area 63. The short nib 37 shown herein will automatically or universally be useable in any of the other area openings or cavity 63 shapes or sizes, and in any slot 9, of FIG. 1, if desired. The FIG. 26 shows, in fragment, the preferred substantially semi-circular end view of nib 37 as it projects outwardly from the conventionally cut away face of stud 36. The nib 37 conventionally and conformably engages in the groove 8 of rule 7. The FIG. 27 is in fragment and shows a transverse nib having an integral substantially round shank, not shown, that is substantially centrally located and pivotally secured through the upper end of the flat faced portion, not shown, of an otherwise conventional stud 36. The pivoting nib 37 is shown in its pivotally moved dashed line position 37', which pivoting action is necessary when a conventional grooved 8 rule 7 and/or a conventional slotted 9 rule 7 is used in combination therewith, as for example, rule 7 shown in FIG. 1 and using the FIG. 3 stud 36 embodiment. Thereby the moved dashed line position of rule 7' as shown in FIGS. 1 and 16, is only possible with this pivoting transverse nib 37 or when using the short nib 37 as shown in FIGS. 25 and 26, for example. It has been found that if the slot 9 in rule 7, shown in FIG. 1 is wide enough, then the pivoting 180 degree and/or the oblique angle dashed line positions, 7' of rule 7, as shown in FIG. 16, for example, is also possible by merely an integral and conventional transverse nib 37, as is used in present day combination squares or protractors, for example, a King type square, Pat. No. 2,448,440 and as shown in the protractors of Parker, Pat. No. 1,529,209, prior art, for example.

FIG. 28 shows, the improved pivoting rule 7, having at least one transverse nib 37 turn around cavity 63, removably secured in a slot 89, not shown, in one end of a dual square head 32. Head 32 having side 2 at a right angle to the substantially extending edge 10, of rule 7, which is retained in a rule 7 receiving slot 89, not shown, that is substantially as is slot 34 shown in FIGS. 16 and 17. In FIG. 28, for example, the slot 89 does not extend into the web 90 portion of head 32, as it does in head 1' of FIG. 16, in which head 1' the otherwise conventionally thin, in cross section, web 90 is preferred to be substantially thicker 87 as shown in FIG. 35, for example, so that a portion of slot 34, for rule 7, may be constructively or properly placed therein, accordingly. The web not numbered in FIG. 28, 90 may also be a thick 87 web, in cross section, down to the top of housing 16 or as far down as one desires, accordingly. The FIG. 28 shows head 32 having at least two pin 13 which allows a person to create sine bar angles or sine angles, accordingly. The head 32 may also be constructed without pin 13, whereby the conventional integral bottom supporting surfaces, for the rectlinear horizontal edge 10 or 11 of rule 7, are used. Thereby the head 32 is a dual square head, as described in copending 167,609 and 786,069 and in the parent application Ser. No. 611,926 including the long 45 degree 78 second side edge, and having the tape 22 extend out of the head 32 as shown in FIGS. 28 and 30, as desired. It is to be understood that any of the previously disclosed rules 7, including any conventional grooved 8 rule or a slotted 9 rule or the improved groove 8 and slotted 9 rule 7 shown in FIG. 1 may be used in the pin 13 head 32 accordingly, in combination therewith. Also, if desired, the bottom of head 32 may be without tape measure 22 and its housing 16 having cover 19 and cam lock arm 20, whereby the entire lower portion of head 32 substantially below the rule 7 slot 89, with or without pins 13 and including opening 79, would be substantially as shown in King, Pat. No. 2,448,440, prior art mechanics square. Also shown are the level vial 17 and its housing 14 of head 32 located in the lower portion thereof, as is also substantially shown in King, Pat. No. 2,448,440 spring means 74, is also shown in the cavity or counterbored hole 73, and shown is nut 72, stud 36, millimeter graduation 88, millimeter indicia 94, graduations 54, indicia 55, end 71 of stud 36 and its barrel portion 70 having the bore 95 in the plane of slot 89, not shown, for the receiving the stud 36, but see FIG. 3, and short 75 groove 8, that were accordingly, previously disclosed, and which are all also generally indicated in FIG. 28.

FIG. 29 shows groove 8, bottom wall 92 of the blind cavity or cavity 63 short 75 groove 8, and a lower portion of cavity 63 exiting out of a narrow channel-like opening 86, which terminates into the notched out corner 67 of rule 7. A substantially beveled slope 93, starting from a top portion of wall 92 to substantially the opposite face of rule 7, is also preferred so that a transverse or short nib 37, not shown, may readily and conveniently be slipped into the opening 86 merely by inserting manually the rule 7 into the rule 7 receiving slot 89 from the, not shown, top edge 3 of head 32, in a substantially jack-knifed closing operation. The disclosed nib 37 may thereby, also automatically substantially turn around, relative to the rule 7 length, in cavity 63 or exit out of the opening 86, merely by lifting the rule 7 upward, if desired. The slope 93 aids a person to slide the nib disclosed 37 into the opening 86 and cavity 63, especially when it is a conventional transverse nib 37 and even when it is not substantially parallel to the inside wall of rule 7 receiving slot 89,

15 as is ordinarily necessary with a conventional unaltered grooved 8 rule 7.

FIG. 30 shows, in fragment, altered lower left corner of head 32, of FIG. 28, showing the tape measure 22 extending substantially perpendicular, or at a substantially right angle to the bottom edge 10 of rule 7, the latter right angle to edge 10 of rule 7 is shown in FIG. 28, for example. This FIG. 30 construction and tape 22 extending direction is preferred over that which is shown in the FIGS. 28, 16 and 1, because a substantially greater number of uses of the square heads and rule 7 in combination with the tape 22 having hook 23 thereon, is possible, and especially when using the sine angle, oblique and/or 45 degree angles, as when making a picture frame and the like, along with the numerous other objects disclosed in the Ser. No. 167,609 copending continuation-in-part application, accordingly. The cam arm 20 and its tape measure 22 locked position are shown in dashed line outline. Side 2, bottom edge 6, cover 19, and hook 23 rivets 24 are also shown.

FIG. 31 shows, in fragment, a lower altered portion of, for example, FIGS. 1, 4, 16, 23, 28 and 30 square heads. The, two-way tape measure 22 aperture 81 opening leads into the tape 22 housing cavity 80 and allows a person to use the same square head for the exiting and extending the tape measure 22 in a substantially parallel or perpendicular direction, relative to the, for example, side edge 2 of at least 1 of the square heads 1, 1' or 32, if desired.

FIG. 32 shows the FIG. 31 two-way tape 22 opening 81 in cross section, taken substantially along sectional line 7—7 of FIG. 31 to show also how the cam 48 tape measure 22 lock may pivot with shaft 47 through manual rotation of arm 20, not shown, to releasably lock the tape 22, against, for example, either of two inside walls of cavity 80, if desired.

FIG. 33 shows a bottom view taken along sectional line 8—8 of FIG. 31 and being substantially the same as seen in FIG. 31, the side 2, bottom side 6, two-way opening 81, and cavity 80.

FIG. 34 shows, in fragment, a rear corner portion of a pin 13, not shown, dual square head or a sine pin-headed dual square head 100 having a rear pivoting gate 96, seen in FIG. 35, and rule 7 supporting edge 10 or 11. Also shown is head 32 edge 3, top edge 11 and bottom edge 10 of rule 7 fragment; rear edge 4, thick web 87 and a curved portion of or gate 96 and side wall face 38. The slotted 60 end 71 in the stud 36 is shown with the integral web 65 therein to prevent the stud 36 and nib 37 (not shown) from rotating when rule 7 is removed from the rule receiving slot 89, if this construction is desired.

FIG. 35 shows the rear view of FIG. 34 showing head 100 having: top edge 3; side edge 38; rear edge 4; pivoting rear gate 96, substantially housed in cavity 104; nut 72; gate 96 thumb gripping ear 97; rule 7 supporting boss 98 of gate 96; the moved dashed line outline 103 location of gate 96; stud 36 having nib 37 in a groove 8 of rule 7 and edge 10 of rule 7 supporting on gate 96 boss 98, but when gate 96 is pivoted to the right 103, then the 45 degree, for example, edge 11 of rule 7 supporting on land 85 located in a bottom portion of slot 34, supports edge 10, accordingly. Thick web 87 having slot 34 therein, as was substantially disclosed for FIG. 16 and 28, for example, and pin 13d shown in FIG. 1 may replace boss 85.

FIG. 36 shows a pin 13 having a longitudinal slot or groove 57, which has a frictional resilient means 58 or a resilient spring means 58 secured therein and having an integral portion 58' thereof project outwardly from the slot 57. The projected free or substantially free portion 58', of resilient means 58, is inserted into an axially extending groove or slot 59, located in the inside wall portion of opening or hole 31, so that a portion of 58' will resiliently and frictionally bear against and/or into at least one portion of the slot 59, as shown, for creating

16 a frictional drag of pin 13 in hole 31. Thereby when pin 13 is entirely and manually forced from its shown position under, for example, edge 10 of rule 7 to another, rule 7 freeing, portion of hole 31, it will automatically be substantially snug against at least one inside wall portion of hole 31, because of the substantially resilient means 58. The pin 13 shown here may also be fitted into hole 31 or hole 31 fitted to pin 13 without any resilient means 58 therein, and be a substantially loose, substantially tight or a substantially, light sliding fit, snug fit, or a substantially tight sliding fit in at least one portion of hole 31, and which pin 13 arrangement and construction as to fit or being fitted into at least one portion of hole 31 or prick punching or peening over at least one end of hole 31, applies to all pin 13 and all hole 31 ends previously disclosed or shown in figures of this specification, as desired, accordingly. The resilient means 58 may also be coiled and be inserted into a hole having at least one ball detent means therein, that is held captive in at least one portion of pin 13 or hole 31, as desired, and the pin 13 and/or hole 31 be either slotless 57 and/or 59, or have at least one slot 57 and/or 59 in either the pin 13 or hole 31, as desired. A portion of the resilient portion 58' shown in FIG. 37 or ball means, not shown, may also be detentable in or across the slot 34, not shown.

It is also to be understood that the length of any pin 13 means disclosed or shown in this specification or drawings thereof, may also be in length substantially the width of head 1, 1', 32 and/or 100, if desired. Of course, one end of the above disclosed long pin 13, if manually forced out, will project out and beyond the face, for example, side edge 28 as is shown in dashed line outline of pin 13' of FIG. 2. In some cases, at least one of the long pin 13' will never be forced to the 13' position as shown in FIG. 2, for example, and thereby be substantially stationary in the hole 31, as desired, especially in the left located pins 13, substantially adjacent edge 2 of, for example, the heads as shown in FIGS. 1, 16, and 28, and the like.

The plain or shouldered screw 99 of FIG. 35 may also have a spring washer (not shown) under its head for creating a drag effect on gate 96, if desired. The set screw 110 is preferred to be snugly fitted in the tapped hole 111, so that gate 96 may, for example, be adjustably positioned under edge 10 or 11 of rule 7, especially if an accurate 90 degree setting is desired between edge 10 or 11 and edge 4 and/or its opposite edge 2, not shown, as the case may be, but see FIGS. 1 and 16, for example.

The FIG. 36 is shown enlarged to afford a better understanding of, for example, a solid pin 13 having a resilient means 58 therein. The slot 59 captively keys the pin 13 against undesirable rotation, in opening 31, which slot 59 may also be eliminated, as shown in FIG. 37.

FIG. 37 is taken substantially along line 10—10 of FIG. 36, rotated 90 degrees from its true showing. The figure shows an enlarged view of the pin 13 which has the resilient means 58, in the groove 57, and its formed up portion 58', detented into the rule 7 receiving slot 34 and also shows how the end of opening 31 may be forged or peened over to form an obstruction 21.

The resilient means 58 may also be captively secured, in slot 59, and pin 13 means of FIG. 36, may be plain or slotless, if desired, whereby pin barrier means 13 if solid and not a spring type pin barrier means 13 would not have to be specially co-axially oriented in opening 31, so that the eliminated slot 57 will never be directly under rule edge 10. If slot 57 was in pin 13 and was inadvertently rotated directly under the rule edge 10, then an undesirable angular error would result, for example, for the accurate 90 degree setting.

Accordingly, the advantages and new results obtainable with this combination tool are thought to be self-explanatory, with the exception of the unique rear gate 96 construction and arrangement, which will now be explained further in detail:

When a person is using the rear gate 96 method, a sine angle tool setting may still be substantially obtained, merely by using the pin barrier means 13 located substantially adjacent edge 2 that is means, used for the 90 degree angle setting, under the rule edge 10, as shown in FIG. 28, for example. Of course, not even one pin 13 need be used at all for obtaining a 90 degree square setting angle, herein or even in FIG. 28, if desired. One such boss is shown in FIG. 35 as boss 85, for example. That is, a person may use at least one integral conventional boss for supporting rule 7, by using its edge 10, as it substantially shown in FIG. 24, for example, of the copending application Ser. No. 167,609, filed Jan. 24, 1962.

Accordingly, the rear gate 96 may be used in combination with at least one rule edge 10 supporting boss 85, for obtaining a 90 degree squaring angle, between rule edge 10 and edge 2, as is shown in FIG. 28, for example. The boss 85 is shown in FIG. 35 and is used whenever a 45 degree angle is desired, as is substantially shown in dashed line outline 71 of rule 7 in FIG. 34 and in FIG. 16, then the short nib 37 is released and the 90 degree position of rule 7 is slid forward until its rear vertical edge, not numbered, clears and is free from the boss 98 and pivoting path of gate 96. A person then slidingly thumbs the rear gate 96 to its dashed line clockwise position 103, as shown in FIG. 35. The rule 7 is then substantially pivoted clockwise on short nib 37, allowing a portion of rule edge 10 to rest substantially on a portion of the 45 degree boss 85 shown in FIG. 35. Then, without complete removal of rule 7 from slot 34, the pin 13e is manually axially moved into at least one portion of, by merely using a screw 30 or the point of a nail 30' which may be supplied in or with the head 1', the rule 7 receiving slot 34 to form a gate-like barrier thereacross, as is substantially shown in FIGS. 2 and 3, for example. The rule 7 is now ready for the positioning of its edge 10 against the boss 85 and against an upper diameter portion of the, for example, axially slidable pin barrier 13e, shown in FIGS. 1 and 16, for example. The nut 72 is then tightened, pulling the stud 36 down, and short nib 37 clampingly against a wall portion of groove 8 and rule 7, so that the rule edge 10 is releasably clamped against the boss 85 and pin 13e.

The result is a very accurate 45 degree oblique angle setting, of rule edge 10 to, for example, edge 2, not shown, of head 100. The edge 2 of head 100 being the same as edge 2 of FIG. 23, for example. To return the rule 7 later to its 90 degree angle, the disclosed procedure is substantially reversed.

The concavo-convex tape 22 and its housing 16, is not shown in FIG. 34, because it is thought that FIGS. 16 and 23, for example, fully show how the lower portion of head 100, including the spirit level vial 17 and its housing 14, is to be integrally combined and/or rigidly yet be removably secured for repairs etc., to the lower portion of head 100, having the shown upper portion of head 100, accordingly.

Since certain changes may be made in the above disclosed combination invention without departing from the scope of the invention herein involved, it is intended that all matter contained in the above description or shown in the accompanying drawings shall be interpreted as illustrative and not in a limiting sense.

I claim:

1. A sine pin-headed combination square comprising in combination: a head having a rule receiving slot which has therein a rule means formed with a groove along one longitudinal face and having at least one rectilinear longitudinal edge portion thereof releasably clamped substantially to said head for forming at least one right angle and at least one oblique angle to a side edge of said head; said head being formed with a bore in the plane of said slot with one end of said bore exiting into an opening remote from said slot; said bore and said opening substantially having therein a clamping means having a short nib means portion thereof releasably clamped in said groove for releasably clamping said edge portion of said rule means against at least one outer surface portion of at least one substantially axially sliding pin barrier means when said right angle is formed and having at least one outer axial surface portion of said barrier means axially slidably housed in at least one portion of at least one opening which extends axially through at least one upper portion of said head and extends axially through at least one wall portion of said slot having at least one axially extended portion of said barrier means therein and substantially not having said barrier means in said slot by substantially manually axially sliding said barrier means out of said slot for freeing said edge portion and for allowing said rule means to be substantially pivoted on at least one portion of said nib further into one portion of said slot and having said edge portion releasably clamped by said clamping means to another said barrier means for forming said oblique angle; whereby a person by merely axially sliding at least one said pin barrier means substantially into, out and into the rule receiving slot will transform a right angle combination square to an oblique angle combination tool and back to the right angle combination square in an improved facile, economical and efficient way.

2. The combination according to claim 1 wherein said head having a second side edge extending at a 45 degree oblique angle to the first mentioned said side edge.

3. The combination according to claim 2 wherein said head having a rear side edge extending substantially from said second side edge and being substantially parallel to at least one portion of the first mentioned said side edge.

4. The combination according to claim 1 wherein said rule means having graduations and corresponding indicia along at least one longitudinal face edge portion and having at least one corner portion notched out for substantially nesting at least one outer diameter portion of a center punch means therein; whereby no measuring indicia need be added or subtracted from said rule means when a center punching operation is made.

5. The combination according to claim 1 wherein said rule means having graduations and corresponding indicia along at least one longitudinal face edge portion and having a said nib turn around opening in direct open communication with at least one substantially end portion of said groove; whereby said rule means may either be pivoted 180 degrees for presenting another set of graduations in substantially direct reading to said edge or be slidingly removed from said head.

6. The combination according to claim 5 wherein said opening is substantially for a transverse nib and which opening is a blind ended cavity having its bottom inside wall top surface substantially parallel to the bottom surface of said groove.

7. The combination according to claim 6 wherein said cavity bottom inside wall having an opening entirely through the thickness thereof.

8. The combination according to claim 7 wherein said cavity being an opening which is entirely through the thickness of said rule means and having said edge portion releasably clamped by said clamping means to at least one boss located substantially in the bottom of said rule receiving slot for forming said oblique angle and by the complete elimination of said barrier means used for forming said oblique angle.

9. The combination according to claim 1 wherein said rule means having graduations and corresponding indicia means along at least one longitudinal face edge for forming a graduated rule means having at least one notched out corner; said graduated rule means having a transverse nib turn around opening in open association and communication with at least one portion of said groove for substantially pivoting and releasably securing said rule means 180 degrees to present said edge portion and said notched out corner in a substantially opposite and parallel position from that which was prior thereto; whereby said rule means may either be pivoted 180 degrees substantially in said head or be slidingly removed from said head.

10. The combination according to claim 1 wherein said rule means having graduations and corresponding indicia along at least one said face and said groove is not in the entire length of said face but is in the form of a dead ended groove for providing a said nib means turn around dead end area which is automatically formed by the dead end portion of said groove in one end of said rule means; whereby said rule means may either be pivoted 180 degrees substantially in said dead end area or be slidingly removed from said head.

11. The combination according to claim 10 wherein said dead ended groove portion is substantially an enlarged opening having said groove in open communication with only one side of said opening.

12. The combination according to claim 1 wherein said groove is made substantially integrally dead ended by coining a stop means in one end of said groove; whereby said rule means may either be pivoted 180 degrees substantially in said head or be slidingly removed from said head.

13. The combination according to claim 1 wherein said rule means having English graduations and indicia along at least one said face and millimeter graduations and indicia along at least one other said face and said groove terminating into a transverse nib means turn around opening; whereby said rule means may either be pivoted 180 degrees substantially in said head for presenting said English or said millimeter graduations and indicia directly in front of said edge of said head or be slidingly removed from said head.

14. The combination according to claim 1 wherein said edge portion of said rule means is supported on one portion of the outer surface of two spaced apart parallel pin barrier means of which at least one is a said barrier means and having a sine angle spacer means manually inserted between an outer surface portion of one of the two said pin barrier means and said edge portion of said rule means for obtaining a sine angle substantially between said right angle releasably clamped position of said edge portion on said parallel pin barrier means and the moved sine angle position of said edge portion.

15. The combination according to claim 14 wherein said spacer means is secured to one end of a substantially flat piece of elongated material having at least one other said spacer means secured substantially beyond the second said pin barrier means and having the thickness portion of said material additionally between both spaced apart said pin barrier means and said edge portion of said rule means.

16. The combination according to claim 1 wherein said rule means having graduation and corresponding indicia means along at least one longitudinal face edge portion thereof and one end of said rule means having at least one notched out corner and at least one tapped hole through the thickness thereof for receiving a threaded portion of a screw means therein.

17. The combination according to claim 16 wherein said groove is in open association and communication with a substantially transverse nib means turn around opening; whereby said rule means may either be pivoted 180 degrees substantially in said head to present said corner and said tapped hole in a 180 degree pivoted position to the said side edge or be slidingly removed from said head.

18. The combination according to claim 1 wherein an axially hollow level vial barrel portion of said head and having its axial length substantially parallel to said edge and having a substantially liquid filled level vial means housed therein to indicate the level position of said side edge of said head; said barrel portion having a wall portion substantially scalloped out for exposing a portion of said level vial means.

19. The combination according to claim 1 wherein at least one portion of the head material which is substantially around at least one end of said opening which substantially houses said pin barrier means therein be forced by a means into at least one axial end portion of said opening for substantially preventing said pin barier means being accidentally slid out of even one end of said opening.

20. The combination according to claim 1 wherein said rule means having a graduation means and corresponding indicia means along at least one longitudinal face edge portion thereof for making measurements and the lower portion of said head having an aperture substantially adjacent to said edge; said aperture being remote from said rule means and leading into a substantially enclosed cavity within said head that substantially houses a resilient, graduated, flexible concavo-convex cross sectional shaped, when free, tape measure and having means therein for returning said tape measure to its wound position in said cavity when said tape measure is manually extended through said aperture remote from said rule receiving slot and being substantially parallel to the length of the releasably clamped said right angle position of said rule means, said tape measure having a hook means secured to its extended end and said cavity having at least one portion of cammed tape lock means located therein for releasibly locking said tape in said extended position through an arm which is accessible and manually movable from the outside of said head.

21. The combination according to claim 1 whereby an axially resilient spring means substantially housed in a cavity of a threaded nut portion of said clamping means with at least one end portion of said spring means being forced against the lower end of a substantially barrel portion of said head that housed the said nib ended portion of a threaded stud portion of said clamping means for automatically resiliently pushing on said nut threaded on one end of said stud and automatically resiliently pulling substantially said nib means down into a transverse nib turn around opening which is located in at least one end of said groove and said rule means to prevent said nibs means from being accidently slid out of a short end portion of said groove which is located at one end of said opening and in at least one end of said rule means; whereby said rule means may either be pivoted 180 degrees substantially in said head or be slidingly removed from said head by manually overcoming the resilient force of said spring means and sliding said nib means out of said short groove end.

22. The combination according to claim 1 wherein the lower portion of said head having an aperture substantially adjacent to said edge; said aperture being remote from said rule means and leading into a substantially enclosed cavity within said head that substantially houses at least one portion of a resilient graduated flexible concave-convex cross sectional shape when free tape measure and a separate resiliently expanding band member means having one of its ends anchored to said head and its other end being free for deflecting the manually inserted tip of the entirely removable said tape measure into a generally circular path and to aid in coiling said tape measure therein; said tape measure when manually drawn out through said aperture substantially forms an extension of said edge; said head having a cammed portion of a tape lock means substantially located in said cavity adjacent said tape measure for releasably locking said tape measure in an extended position by manually moving an arm secured to one end of said cam and which arm is accessible from the outer portion of said head and said tape measure having on its extended end a said tape measure hook means secured thereto.

23. The combination according to claim 22 wherein said head having mounted therein and having its length substantially parallel to said edge is a substantially liquid filled level vial means.

24. The combination according to claim 1 wherein the lower portion of said head having an aperture substantially adjacent to said edge; said aperture being remote from said rule means and leading into a substantially enclosed cavity within said head that substantially houses a resilient graduated flexible of concavo-convex cross sectional, shape, when free, tape measure and power return means for said measure; said portion of said head having a power return release button accessible from the outside of said head and being substantially located over said enclosed cavity; said tape measure when manually drawn out through said aperture substantially forms an extension of said edge; said head having a portion of a cammed tape lock means located in said cavity adjacent said tape measure for releasably locking said tape measure in an extended position through manual movement of an arm accessible from the outside of said head and being located substantially over said cavity in said head and said tape measure having on its extended end a tape measure hook means secured thereto.

25. The combination according to claim 1 wherein said head having an aperture in its lower disposed portion with said aperture being remote from said slot and leading into a substantially enclosed cavity within said head; said cavity substantially houses a resilient graduated flexible of concavo-convex cross sectional shaped, when free, tape measure and a spirally coiling spring means anchored at its inner end substantially to said head; said spring means having its outer end operatively secured to an inner end of said tape and tending to substantially hold said tape measure in its wound position; said tape measure having a said tape measure hook means secured to its extended end and when said tape measure is manually drawn out of said aperture it substantially forms an extension of said edge; said head having at least one portion of a cammed said tape measure lock means located in said cavity and having an arm which is accessible from the outside of said head and which arm is manually moved for releasably locking said tape measure in an extended position.

26. The combination according to claim 25 wherein said head having mounted therein and having its length substantially parallel to said edge is a substantially liquid filled level vial means.

References Cited

UNITED STATES PATENTS

| | | | |
|---|---|---|---|
| 491,351 | 2/1893 | Hetu | 33—103 |
| 611,129 | 9/1898 | Lafferty | 33—94 |
| 1,525,813 | 2/1925 | King | 33—102 |
| 1,690,919 | 11/1928 | Baine | 33—95 |

FOREIGN PATENTS

| | | |
|---|---|---|
| 572,276 | 10/1945 | Great Britain. |
| 616,220 | 1/1949 | Great Britain. |

HARRY N. HAROIAN, Primary Examiner

U.S. Cl. X.R.

33—89, 138